3,305,403
PREPARATION OF FUEL CELL ELECTRODES WITH EITHER PYROPHORIC CATALYST MATERIAL OR NON-PYROPHORIC CATALYST MATERIAL
Vito Corso, Jr., and William Preston Colman, Stamford, and Joseph Carlin, New Canaan, Conn., assignors to American Cyanamid Company, Stamford, Conn., a corporation of Maine
Filed Feb. 23, 1965, Ser. No. 440,988
11 Claims. (Cl. 136—120)

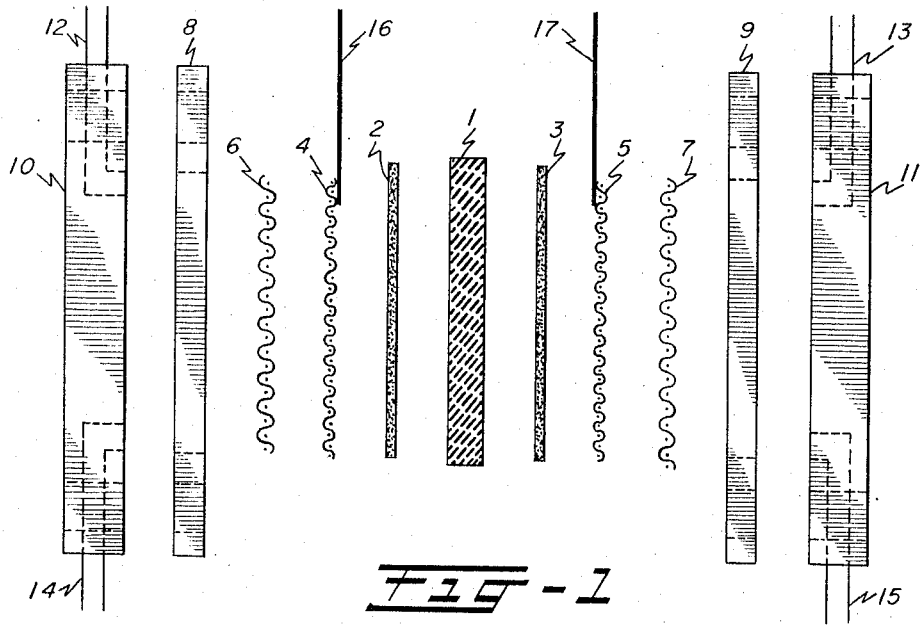
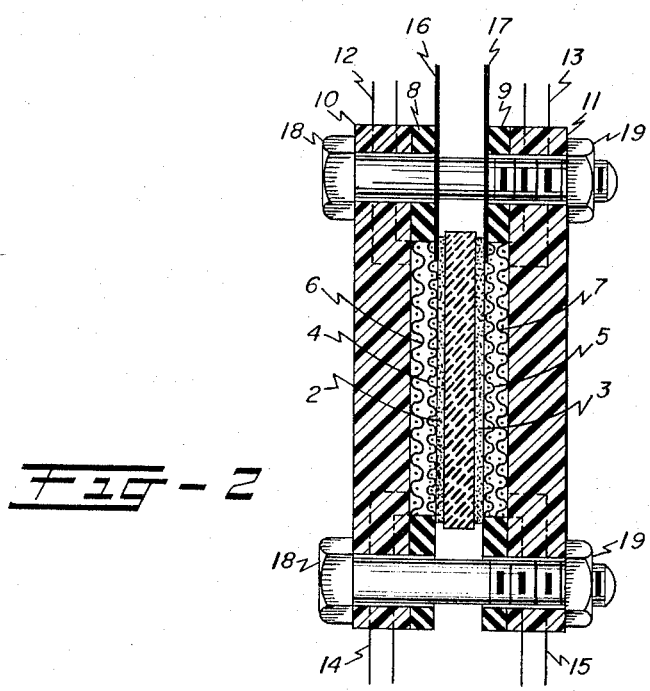

This application is a continuation-in-part of a copending application for U.S. Letters Patent, Serial No. 405,186, filed October 20, 1964, now abandoned.

The present invention relates to a novel method for the manufacture of fuel cell electrodes. More particularly, it relates to a process for uniformly distributing a catalytic composition upon a screen substrate utilizing a calendering or a rolling technique at ambient temperature to prepare enhanced electrodes suitable for use in a variety of fuel cells as, for instance, hydrazine-air, hydrogen-oxygen, hydrogen-air and propane-air fuel cells.

It is known that a fuel cell electrode comprising a catalyst and a suitable substrate therefor can be prepared, for example, by hand-spreading a platinum catalyst composition over the surface of a screen substrate and passing the latter through a set of rollers to imbed the catalyst composition into the substrate. Unfortunately, non-uniformity of catalyst solids-loading and poor reproducibility of results, when utilizing a so-formed electrode, are at best attained. Further, the mechanical stability of the electrode is found to be highly unsatisfactory in most applications. Rapid deterioration is also observed after operating within a relatively short period of time apparently due to the erosion of poorly distributed catalyst when exposed to high gas velocities normally employed in operating a gas fuel cell.

A principal object of the present invention, therefore, is to provide a method for preparing catalyst-containing electrodes which obviate the aforementioned difficulties. It is a further object of the invention to provide a method for preparing electrodes of enhanced performance and mechanical stability. A still further object is to provide an improved procedure for manufacturing an electrode having acceptable reproducibility with respect to both catalytic loading and electrochemical results so as to obtain stable voltages at high current densities. These and other advantages will become apparent from a consideration of the ensuing description.

To this end, it has been unexpectedly found that a multiple rolling procedure for preparing an electrode at ambient temperatures results in an electrode which has distributed uniformly therein a catalyst composition. Surprisingly, a mechanically strong electrode capable of electrochemical reproducibility is readily obtained, principally by subjecting a catalyst solids composition applied to a metallic or equivalent substrate to a plurality of passes through rollers.

According to the process of the invention, a uniformly catalyst-distributed electrode is formed by initially utilizing a paste mixture comprising a catalyst in the form of an aqueous suspension, mineral oil, a water-repellent substance, such as polyethylene or polyfluoroethylene latex, and a dispersant, such as colloidal or granular silica or alumina. As formulated, the latter mixture exhibits a consistency ranging from a grease to a stiff putty. A measured quanity is applied to a suitable substrate and, preferably substantially evenly along one edge of the substrate. The latter is then sandwiched between inert plastic cover sheets having an area larger than the substrate. Thereafter, the over-all composite is passed through suitable rollers at ambient temperature. For best operation, the edge containing the applied catalyst solids mixture is initially introduced. After the first pass through the rollers, transfer of any excess paste mixture to the inert cover sheets is readily observed. Such excess which is without the area defined by the substrate is recovered from the inert plastic cover sheets and reapplied to the opposite edge of the so-calendered substrate screen.

The rolling procedure is again repeated. Excess paste from the plastic cover sheets is once more removed and reapplied, preferably to an opposite edge of the substrate. This procedure is repeated for a totality from about four to fifteen times, or more, until the catalyst-solids paste on a subsequent pass becomes sufficiently "rubberized" so that substantially no excess catalyst paste is transferred to the plastic cover sheets. This indicates that the catalyst-solids composition, dispersed evenly throughout the substrate, is sufficiently bonded to the substrate. Usually, a good practice is to pass the substrate or screen and catalyst content through the rollers from nine to fifteen times, while reapplying transferred excess paste as indicated above after each pass. The sheets are next removed to recover a uniformly distributed, mechanically strong electrode prepared entirely at ambient temperatures.

Resultant electrode is next activated by removing all foreign substances introduced during its preparation. These impurities are, for instance, the dispersant and mineral oil. First, any strong alkali, such as sodium hydroxide or potassium hydroxide, can be employed to remove silica. To remove alumina, this impurity may be washed out with a mineral acid, such as sulfuric acid or a strong alkali. The so-activated electrode is washed with water to remove residual alkali or acid, followed by an aliphatic hydrocarbon solvent rinse to remove residual mineral oil. Illustrative aliphatic hydrocarbon solvents include hexane or heptane. To remove any aliphatic hydrocarbon solvent, an appropriate alkanol, such as ethanol, is employed followed by a water wash to remove residual alkanol. Thereafter, the electrode is dried to remove water, cut to desired size for use in a fuel cell and packaged.

In preparing the initial catalyst-solids mixture, any of a variety of both pyrophoric and non-pyrophoric catalysts is contemplated. Illustrative non-pyrophoric catalysts, i.e., those which are unaffected adversely by air oxidation, are, for instance: silver, silver oxide and sodium borohydride-reduced noble metals, such as platinum, palladium, or ruthenium, present either as such as supported on a carbon. However, pyrophoric catalysts, i.e., those adversely affected by air oxidation, such as sodium borohydride-reduced nickel and diphenylsilane-reduced platinum, can also be employed, provided they are initially pretreated.

Pretreatment of pyrophoric catalysts consists in adding mineral oil to a water slurry of the catalyst. Usually, a weight ratio in the range of 5:1 to 10:1 of mineral oil to dry catalyst is sufficient to saturate the catalyst so as to obtain adequate protection against air oxidation. If desired, any commercially available wetting agent, such as Triton X–305 (e.g., a higher alkylaryl polyoxyethanol), can be admixed with the oil added to the slurry. The latter mixture is then dried to remove substantially all residual water. Resultant pretreated catalyst in the form of either an oil-wetted powder or an oil slurry is employed as the catalytic-solids mixture in the process of the invention.

In general, any water-repellent compound can next be incorporated as an ingredient of the catalyst-solids paste composition employed in the rolling process of the invention. For instance, polyfluoroethylene or polyethylene latex ranging in amounts from about 5% to about 100% and preferably from 15% to 35%, based on the catalyst solids, can advantageously be added to the catalyst.

As a suitable dispersant there can be added either silica or alumina to the catalyst mixture in amounts ranging from about 5% to about 50%, and preferably from 15% to 35%, based on the weight of catalyst solids. The dispersant may be present in granular or colloidal form.

To render the catalyst-solids mixture readily useable in the present invention, there is included in the composition from 30% to 500%, or more, of a mineral oil, based on the weight of the catalyst solids. However, where the catalyst is pyrophoric and has been originally pretreated as hereinabove indicated, the addition of mineral oil as required for non-pretreated catalysts can, if desired, be omitted.

In preparing the substrate or screen prior to the application of the catalytic-solids mixture thereon, the substrate is preferably washed with an appropriate solvent, such as trichloroethylene, and then treated with ethanol. In the presnt process, the substrate advantageously can be fabricated from either a metal, such as nickel and tantalum, or a plastic, such as polyfluoroethylene. Its use is dependent upon its inertness to the fuel cell environment.

As above stated, the catalytic-solids mixture can be spread on the substrate and preferably over one edge of that substrate. If desired, a ten percent (10%) excess of catalyst mixture is spread initially over the substrate so as to ensure that the area thereof is completely covered at all times for each pass through the rollers.

Mylar or other suitably appropriate inert plastic sheets of larger area than the substrate are employed to sandwich the screen. If desired, the Mylar sheets can be covered with blotting paper so that the roll pressure is distributed uniformly over the laminate structure. As the laminated structure, preferably with the catalyst solids edge leading, is passed through a set of rollers, the catalytic-solids mixture is pressed into the interstices of the screen. The top plastic sheet is gently peeled or removed from the laminate structure. Excess catalyst mixture appears on the Mylar plastic sheets surrounding the peripheral area exterior to the substrate. This excess mixture is recovered from that peripheral area and reapplied to the substrate with a spatula.

Transferred catalyst mixture, if any, corresponding to the confines of the screen or substrate area per se, is left untouched and intact on the top plastic sheet. Excess peripheral catalytic mixture is similarly removed from the unstripped sheet which supports the substrate or screen. Excesses obtained from both sheets are combined and spread on the screen, preferably on the edge opposite that previously employed as the leading edge. In so proceeding, uniformity of catalyst application is achieved. This procedure is repeated until the catalyst mixture becomes rubbery to the touch and is substantially no longer transferred from the screen to the plastic cover sheets. To achieve this state, at least about four roller passes, or more, are required. In general, an electrode of any size can be prepared limited solely by the length of the rollers.

Rolling or calendering is carried out with suitable rollers which may be fabricated, for example, from stainless steel. The rollers are usually adjusted to a linear speed between about 1 and about 15 feet per minute while exerting a force from about 25 to 200 pounds per linear inch of rolls.

In order to clarify the invention utilizing the above-formed electrode, the accompanying drawing defines one embodiment of such utilization. In the drawing:

FIG. 1 is an exploded plan view partially in section of a fuel cell employing a plurality-rolled electrode made according to the present invention, and FIG. 2 is a partially expanded side view, partially in section of the fuel cell of FIG. 1.

In FIG. 1, a glass fiber paper matrix saturated in 5 N sulfuric acid is positioned between electrodes 2 and 3 as prepared by the process of the invention. Abutting the latter electrodes are current collector screens 4 and 5 which comprise stainless steel or other suitable inert metal. Stainless steel wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as silicone rubber. These seal as well as separate the chambers containing reactants. Exterior to the gaskets are housing members 10 and 11 having inlet stainless steel or other inert metal tubing 12 and 13 through which reactant gases, for example, hydrogen and oxygen, are separately introduced into the fuel cell. Stainless steel tubing 14 and 15 are provided as vents for unused gases. Wire leads 16 and 17 connected onto current collector screens 4 and 5 are the conductive members through which current flows from and to the fuel cell via the external circuit when the cell is in operation. The cell is secured by means of bolts 18 and nuts 19 as shown in FIG. 2.

The invention will be illustrated in conjunction with the following examples which are to be taken as illustrative only and not by way of limitation. All parts employed in this specification are by weight, unless otherwise stated.

*Example 1*

A catalytic-solids paste is prepared by admixing in a suitable vessel 100 parts of sodium borohydride-reduced platinum, 50 parts of colloidal alumina, 54 parts of polyfluoroethylene latex as a 60% emulsion, 100 parts of water and 88 parts of mineral oil. The paste is next applied to a screen by spreading the catalytic-solids paste on one edge of a 6″ x 8″ tantalum screen of 50 mesh size. The platinum catalyst loading on the screen is equivalent to ten milligrams per square centimeter. The screen is next covered by two 10″ x 12″ Mylar polyethylene terephthalate plastic sheets of 5 mils thickness and passed through two stainless steel rollers, maintained at a linear speed of four feet per minute and a pressure of 60 lbs. per linear inch.

Excess catalytic paste which is transferred to the Mylar sheets is removed from the peripheral area surrounding the metallic screen. The area is exterior to the 6″ x 8″ tantalum screen. However, any paste within the screen area transferred to the Mylar sheet is left undisturbed and intact on the plastic sheet. After collecting and reapplying all the excess paste to the screen edge opposite the lead edge used in the last pass, the Mylar sheets are again precisely matched and applied as such so as to sandwich the screen containing excess paste on one edge. The laminate composite is fed into the rollers leading with the excess catalytic paste edge.

The foregoing procedure is repeated nine times while removing excess paste from the Mylar sheets and reapplying the same to an opposite edge of the screen. A small but insignificant excess of paste on the Mylar plastic sheets remains without the area defined by the screen. Rolling was discontinued because the catalytic solids paste after nine passes became sufficiently rubbery so that any significant transfer to the Mylar sheets did not take place, although uniform covering of the screen is accomplished.

The composite is stripped from the Mylar sheets. Resultant formed electrode is next introduced into baths containing 5 N sulfuric acid, distilled water, heptane, ethanol and distilled water, in that order. On drying, an electrode of long life containing uniformly distributed, well adhering catalyst is obtained for use in a fuel cell.

*Example 2*

The procedure of Example 1 is repeated in every detail except that a trichloroethylene washed tantalum screen is employed and the catalytic solids paste comprises: platinum black (100 parts), colloidal alumina (25 parts), polyethylene latex (33.3 parts as 40% solids emulsion), water (100 parts) and mineral oil (88 parts).

Excellent adherence and distribution of catalyst composition on the metallic screen is achieved.

*Example 3*

In repeating the procedure of Example 1 in every detail except that 100 mesh nickel screen is employed in lieu of the tantalum screen and twelve passes rather than nine are utilized. The catalytic paste composition as applied to the metallic screen is uniformly distributed thereon. This composition comprises: a mixture of 5% platinum and 5% rhodium on graphite (100 parts), colloidal silica (25 parts), polyfluoroethylene latex (33.3 parts as 60% solids emulsion), water (87 parts) and mineral oil (52 parts).

To remove colloidal silica when activating the formed electrode, 5 N potassium hydroxide is employed in lieu of sulfuric acid of Example 1.

*Example 4*

Repeating the procedure of Example 3 in every detail except that a 3" x 3" stainless steel screen of 120 mesh size is utilized. The following ingredients are admixed and applied to the screen in an amount sufficient to provide a loading of 5 mg. of catalyst per square centimeter: platinum black (100 parts), colloidal silica (25 parts), polyfluoroethylene latex (33.3 parts as 60% solids emulsion), water (125 parts) and mineral oil (57 parts).

Excellent adherence of the catalytic paste, uniformly distributed on the screen, is achieved.

*Example 5*

Several components herein below are admixed to provide a catalyst paste which is applied to a 6" x 8" nickel screen of 40 mesh size to form an electrode having a loading of 50 mg./cm.$^2$ of silver oxide catalyst. These components are: silver oxide catalyst (100 parts), colloidal alumina (25 parts), polyfluoroethylene latex (100 parts as 60% solids emulsion), water (80 parts) and mineral oil (66 parts).

The procedure of Example 3 is then followed in every detail. The paste composition is applied to the screen, passed through rollers successively and washed to remove foreign substances. A uniformly distributed catalytic electrode having excellent adherence characteristics is obtained.

*Example 6*

On a 11" x 11.5" tantalum screen of 50 mesh size is incorporated a catalyst-solids composition comprising 25% sodium borohydride reduced platinum on graphite to form an electrode having a loading of 2.5 mg. platinum per square centimeter. The catalyst composition which is applied to the screen is prepared by admixing the following components: 25% platinum on graphite (100 parts), colloidal alumina (17.7 parts), polyfluoroethylene latex (23 parts as 60% emulsion), water (100 parts) and mineral oil (88 parts).

The paste mixture is applied as in Example 1. The screen and catalyst composite is passed seven times through the rollers. Here uniform distribution of the catalyst having excellent tenacity is obtained.

Advantageously, when representative formed electrodes are employed in a hydrogen-oxygen fuel cell containing 5 N sulfuric acid as the electrolyte hereinabove described and operated at ambient temperature and at atmospheric pressure, voltages obtained at 0, 20, 40, 100 and 200 milliamperes per square centimeter, respectively, are as follows in volts: For the electrode prepared in accordance with Example 2, 1.033, .90, .86, .81, .75, respectively, are recorded. For the electrode prepared by Example 6, volts of 1.01, .82, .77, .69, .60, respectively, are noted.

*Example 7*

This example illustrates the pretreatment of a pyrophoric catalyst.

To a suitable vessel containing 100 parts of an aqueous slurry containing 5 parts of pyrophoric, sodium borohydride-reduced nickel catalyst is added 21.5 parts of mineral oil and 1 part of Triton X–305. The latter mixture is dried at 70° C. under a 25" Hg vacuum. There is then obtained a dried, oil-wetted powder containing 18.2% reduced-nickel catalyst. To 100 parts of the resultant oil-wetted powder are next added 5 parts of colloidal alumina, 6 parts of polyfluoroethylene latex as a 60% emulsion and 25 parts of water to form a paste. This paste is next applied to a 6" x 8" 40 mesh nickel screen by spreading the paste along one edge. The nickel catalyst loading on the screen is equivalent to twenty-five milligrams per square centimeter. It is next covered by two 10" x 12" Mylar polyethylene terephthalate plastic sheets of 5 mils thickness. Resultant composite is next passed through two stainless steel rollers leading with the edge treated with paste. The rollers are maintained at a linear speed of four feet per minute and a pressure of sixty pounds per linear inch.

Excess catalytic paste which is transferred to the Mylar sheets is removed from the peripheral area surrounding the metallic screen. The area so affected is exterior to the 6" x 8" nickel screen. However, any paste within the screen area transferred to the Mylar sheet is left intact and undisturbed on the plastic sheet. After collecting and reapplying all the excess paste to the screen edge opposite the lead edge of the composite in the first pass, the Mylar sheets are again precisely matched and applied as such so as to sandwich the screen containing excess paste on one edge. The laminate composite is fed into the rollers while leading with the edge containing the excess catalytic paste.

The foregoing procedure is repeated nine times while removing excess paste from the Mylar sheets and re-applying the same to an opposite edge of the screen. A small but insignificant excess of paste on the Mylar plastic sheets remains without the area defined by the screen. Rolling is discontinued because the catalytic solids paste after nine passes became sufficiently rubbery so that any significant transfer to the Mylar sheets did not take place, although uniform covering of the screen is accomplished.

The composite is stripped from the Mylar sheets. Resultant formed electrode is next introduced into successive baths containing in each 5 N potassium hydroxide, distilled water, heptane, ethanol and distilled water, in that order. When resultant electrode is not used immediately, it is stored in water until ready for use. On drying, preferably in an inert atmosphere, such as nitrogen, an electrode containing uniformly distributed, well adhering catalyst is obtained for immediate use in a fuel cell.

It is also an advantage of the process of the present invention that electrodes of any desired area and enhanced structural strength can be provided. Ready control in the uniform distribution of catalyst mixture upon a screen and a high level of reproducibility in electrochemical results are attained.

We claim:
1. In the preparation of an electrode adapted for use in a fuel cell, the improvement which comprises the steps of:
  (a) applying on a screen substrate an aqueous catalyst mixture comprising a catalyst, water-repellent compound, mineral oil and a dispersant selected from the class consisting of silica and alumina present in an amount sufficient to cover said substrate after calendering the same;
  (b) sandwiching the so-prepared substrate between inert plastic sheets selected from the class consisting of polyethylene and polyethylene terephthalate having an area exceeding that of the substrate to accommodate transferred catalyst mixture when calendered;
(c) passing the so-sandwiched composite structure through rollers;
(d) stripping the inert sheet from the composite;
(e) removing transferred catalyst mixture from the said sandwiching sheets in the area exterior to that defined by the said substrate;
(f) reapplying the transferred catalyst mixture to the screen substrate;
(g) sandwiching the substrate again whereby the inert plastic sheets are repositioned over the screen substrate;
(h) passing the latter structure through the rollers for a total of at least four passes until there occurs rubberization of the catalyst mixture and a minimal transfer of catalyst mixture to the said sandwiching sheets;
(i) stripping the latter sandwiching sheets from the substrate containing uniformly distributed catalyst; and
(j) activating the so-prepared catalyst substrate structure by removing included dispersant and mineral oil therefrom.

2. A process according to claim 1 in which the number of passes through the rollers ranges from between nine and twelve.

3. A process according to claim 1 in which the catalyst is a non-pyrophoric catalyst.

4. A process according to claim 3 in which the catalyst is non-pyrophoric, sodium borohydride-reduced platinum.

5. A process according to claim 3 in which the catalyst is silver oxide.

6. A process according to claim 3 in which the catalyst is a mixture of rhodium and platinum on graphite.

7. A process according to claim 1 in which the water-repellent compound is polyfluoroethylene latex.

8. A process according to claim 1 in which the water-repellent compound is polyethylene latex.

9. A process according to claim 1 in which the catalyst is a pyrophoric catalyst.

10. A process according to claim 9 in which the catalyst is pretreated mineral oil-saturated sodium borohydride-reduced nickel.

11. A process according to claim 9 in which the catalyst is pretreated mineral oil-saturated diphenyl silane-reduced platinum.

No references cited.

WINSTON A. DOUGLAS, *Primary Examiner.*

A. SKAPARS, *Assistant Examiner.*